United States Patent
Nishikawa

(10) Patent No.: US 9,925,479 B1
(45) Date of Patent: Mar. 27, 2018

(54) METHODS AND APPARATUS FOR FILTRATION

(71) Applicant: Albert Nishikawa, Tarzana, CA (US)

(72) Inventor: Albert Nishikawa, Tarzana, CA (US)

( * ) Notice: Subject to any disclaimer, the term of this patent is extended or adjusted under 35 U.S.C. 154(b) by 8 days.

(21) Appl. No.: 15/530,384

(22) Filed: Jan. 5, 2017

(51) Int. Cl.
| | |
|---|---|
| B01D 24/28 | (2006.01) |
| B01J 19/24 | (2006.01) |
| C02F 1/28 | (2006.01) |
| B01D 15/02 | (2006.01) |
| B01D 24/40 | (2006.01) |
| C02F 1/00 | (2006.01) |
| C02F 101/10 | (2006.01) |

(52) U.S. Cl.
CPC ............ *B01D 24/28* (2013.01); *B01D 15/02* (2013.01); *B01D 24/40* (2013.01); *B01J 19/2415* (2013.01); *C02F 1/004* (2013.01); *C02F 1/28* (2013.01); *B01J 2219/24* (2013.01); *C02F 2101/10* (2013.01)

(58) Field of Classification Search
None
See application file for complete search history.

(56) References Cited

U.S. PATENT DOCUMENTS

| | | | | |
|---|---|---|---|---|
| 3,239,062 A * | 3/1966 | Rosaen | ............... | B01D 27/00 210/132 |
| 3,618,776 A * | 11/1971 | Kudlaty | ............... | B01D 35/147 210/130 |
| 3,640,390 A * | 2/1972 | Goy | ............... | B01D 27/08 210/130 |
| 3,819,052 A * | 6/1974 | Firth | ............... | B01D 35/143 210/131 |
| 3,847,243 A * | 11/1974 | Barth | ............... | B60Q 1/44 180/406 |
| 3,960,174 A * | 6/1976 | Latimer | ............... | F15B 1/26 137/563 |
| 4,142,973 A * | 3/1979 | Kachman | ............... | B01D 35/143 137/554 |
| 4,279,746 A * | 7/1981 | Leutz | ............... | B01D 29/117 137/543.15 |
| 4,343,697 A * | 8/1982 | Miller | ............... | B01D 29/117 210/130 |
| 4,783,271 A * | 11/1988 | Silverwater | ............... | B01D 29/15 210/149 |
| 4,894,149 A * | 1/1990 | Block | ............... | B01D 24/004 210/101 |
| 5,067,454 A * | 11/1991 | Waddington | ............... | F01D 25/20 123/196 AB |
| 6,908,545 B2 * | 6/2005 | Mouhebaty | ............... | B01D 29/21 123/195 S |

* cited by examiner

Primary Examiner — Robert James Popovics

(57) ABSTRACT

This invention, methods and apparatus for filtration provides the fluid filtration through the flowing granular material or filtration of the flowing granular material through the flowing fluid. The improved apparatus comprises a body including a substance inlet tubular member for passage of substance into the body, a substance outlet tubular member for passage of substance out of the body, a fluid inlet tubular member for passage of fluid into the body, a fluid outlet device for passage of fluid out of the body, a fluid distribution member comprising a plurality of apertures (perforation), and a diaphragm.

16 Claims, 5 Drawing Sheets

METHODS AND APPARATUS FOR FILTRATION

FIELD OF THE INVENTION

The invention relates to the methods and apparatus for filtration. More specifically, invention relates to the fluid filtration through the movable (flowing) granular (arenaceous) substance (material) or filtration of the movable granular substance through the flowing fluid.

BACKGROUND OF THE INVENTION

There are known many methods and apparatus (devices) for fluid filtration.

Most fluid filtration apparatus include filter element. Some fluid supply systems are normally constructed to have unfiltered return fluid enter the bottom of a filter element mounted in the reservoir, but some apparatus (devices) use the return fluid filter assemblies located within fluid supply reservoirs.

For instance, the reservoir, described in the U.S. Pat. No. 3,847,243, includes a return fluid compartment located below the filter assembly and return fluid plumbing is connected to the compartment which is in turn connected in fluid communication with the bottom of a filter element.

This patent has the further drawback that in the event of a failure in the return fluid plumbing or in components connected thereto, a considerable amount of fluid might drain from the reservoir due to the failure or might have to be drained from the reservoir before the failed component can be replaced.

In others of these systems, as represented by U.S. Pat. No. 3,960,174, the return fluid plumbing is connected directly in communication with the lower end of the filter element.

Such devices have a common drawback, i.e.: the unfiltered fluid in the apparatus will drain from the filter element as the latter is being withdrawn from the reservoir for replacement.

For example, the device by U.S. Pat. No. 4,343,697 includes a pair of return fluid filters supported within a main cavity of a hydraulic fluid reservoir for receiving fluid from the bottoms of respective return fluid cavities defined by a housing fixed to a top wall of the reservoir. The apparatus by this patent does not have that deficiency, because the return fluid inlet is located in the filter at a level above that to which the reservoir containing the filter assembly is intended to be filled, but this device requires a considerable amount of space in the top of the reservoir to be kept empty. The appropriate access covers close the cavities and are connected to the return fluid filters and to respective removable bottom plates of the cavities such that the filters may be withdrawn from the main cavity, via the return fluid cavities, for service or replacement. All cavities are provided with a bypass valve which acts to bypass return fluid directly from the associated return fluid cavity to the main cavity in the event that the associated filter becomes clogged. The switches, which are respectively operated in response to movement of the bypass valves to their bypass position to energize a light to indicate the clogged filter condition to an operator, are mounted on the housing in alignment with the bypass valves. The device comprises the housing which defines two separate return fluid cavities. The access to the first cavity is vertically aligned upper and lower circular openings. The top opening is closed by an access cover releasably held in place by a plurality of cap screws. The bottom opening is blocked by a circular plate, having a seal located in its periphery of the plate. Specifically, the plate is provided with a centrally located threaded hole disposed in vertical alignment with a threaded blind bore located in the lower end of a projection formed integrally with the underside of the access cover. The device also includes a plurality of bolts, a piece of hexagonal bar stock which is fixed to the lower end of one of the bolts for engagement to facilitate tightening. The mating ends of the filter elements are centered by means of a guide member. The first hole in the plate establishes fluid communication between the first cavity and the top end of the stacked filter elements while the second hole in the guide member insures free fluid flow from the upper to the lower one of the elements. The second cavity is similar to the first cavity and is vertically aligned upper and lower circular openings. An access cover is releasably fixed over the opening.

Additionally, a first return fluid conduit enters the bottom wall of the reservoir and is coupled to a return fluid inlet port located in the bottom wall of the first return fluid cavity at approximately the full level. Similarly, a second return fluid conduit enters the bottom wall of the reservoir and is coupled to a return fluid port located in the bottom wall of the second return fluid cavity. The conduits form part of the return fluid plumbing of first and second hydraulic subsystems. Fluid is supplied to the first and second sub-systems by means of first and second fluid supply conduits extending through the bottom wall of the reservoir. The housing also defines defines portions of separate bypass valve assemblies located within the first and second return fluid cavities and including appropriate vertical valve bores having bottom ends in direct fluid communication with the main cavity, at a level below the full level, and having upper ends in direct fluid communication with the first and second return fluid cavities. Upon the filter elements becoming clogged, the pressure in the first cavity will shift downwardly to a bypass position to unblock a bypass port connecting the bore in fluid communication with the main cavity and to permit the switch to open passage.

The apparatus by this patent is complex and not efficient.

The other types of the fluid (e.g., oil) are well known. The prior art has recognized the desirability of providing bypass means to permit oil to pass around the filter element when it becomes clogged. The U.S. Pat. No. 3,239,062 discloses an oil filter assembly including a single cylindrical filter element.

One of the inherited deficiencies is: the structure is not easily adapted to a wide variety of installations. The removal of the cover can lead to a loss of oil from the housing. Also, the indicator extends through the housing provides an additional sealing problem and exposes the indicator mechanism to damage.

Some types of the fluid filters can include the plurality of cylindrical filter elements. For example, the fluid filter by U.S. Pat. No. 3,819,052 comprises a first cylindrical filter housing having an open top is at least partially surrounded by a second housing forming a passageway therebetween. A baffle with a central opening is mounted in the open top and a cylindrical filter element is yieldably biased against the baffle member in the first housing. A dome-shaped cover is attached on top of the second housing to provide a flow path for fluid flowing from the passageway to the central opening in the baffle member into the filter element for passage through the filter element and then through an opening in the second housing. A combiNat. and husbandion bypass-indicator member is attached to the top of the movable filter element for guided sliding movements in the central opening of the baffle member. The described oil filter includes a first cylindrical inner filter housing with a wall including a lower portion and a reduced diameter upper portion. The upper and lower portions are joined along a plane intersecting that housing at an angle of approximately 45°. Housing has an open top end terminating in a circular edge lying in a horizontal plane. The bottom end of housing is closed off by means of a bottom end member having a drain plug secured in an opening therein. Surrounding the upper portion of first housing is a second housing (outer wall) having the same diameter as lower portion. Second housing is cylindrically shaped configuration and terminates in an upper edge, which is a circular and lies in a horizontal plane position. Second housing defines an annular passageway which is located between upper portion and second housing. Passageway is closed along plane by means of an outwardly extending flange. The annular space between upper edges is open. A fluid inlet opening is provided in outer housing directly across from an outlet opening in the first housing. A cylindrical filter elements are mounted in the filter chamber of housing between spring and baffle. The clean fluid (oil), after passing through the filter elements is discharged into the inner housing from where it passes downwardly through openings in the bottom end of the coupled member. The bottom end of inner housing is secured in an opening extending into a separate clean oil chamber. The clean oil leaves the chamber through an outlet opening.

The U.S. Pat. No. 4,783,271 discloses a filter assembly filtering the fluid and comprising two filter elements and a structure for directing the fluid first through one filter and then through the other. The filter assembly includes a mechanism for sensing the temperature of the fluid and a valve, which is responsive to the temperature-sensing mechanism. The valve is arranged in parallel with the upstream filter so that, when the fluid temperature reaches a predetermined value as sensed by the sensing mechanism, the valve opens, allowing the fluid to bypass the upstream filter and flow through the coarser downstream filter.

The apparatus disclosed by the U.S. Pat. No. 5,067,454 is related an automatic self-compensating flow control system. The device provides the fluid pulling from a reservoir by means of a suitable pump through a replaceable filter assembly which incorporates a controlled bypass valve which, together with the filter assembly is an integral part of the pump assembly.

The bypass valve allows essentially dirty oil to be supplied to the components of the drive system requiring lubrication in emergency situations during which the oil filter is clogged.

The U.S. Pat. No. 6,908,545 describes the hydraulic filter. The hydraulic fluid filter utilizes a priority valve installed in a manifold to allow for continuous filtration of hydraulic fluid up to a predetermined flow value and diverts occasional high flow to a secondary circuit. This arrangement provides a low pressure drop at a high flow condition. Particularly, this device for fluid (hydraulic fluid) filtration is related to a filter assembly for high pressure, high flow rate and low pressure drop applications. Fluid cleanliness is an important property of hydraulic fluid, as well as any fluid used in the human needs. The level of undesirable contaminants in the hydraulic fluid affects the quality of system performance, as well as the useful life of substantially all of the working hydraulic components within a hydraulic apparatus. All moving components in contact with the fluid are vulnerable to wear, and attendant premature failure if such contaminants are not removed from the apparatus. The proper cleaning of the fluid to remove undesirable contaminants can significantly lengthen the life of the apparatus' components, as well as reduce maintenance and its attendant costs. Effective cleanliness control results the reliability and performance of the system. Maintenance of a clean fluid requires efficient filtration. A number of methods have been utilized to control the cleanliness of the fluid in hydraulic apparatus. For example, a filter may be interposed in line before the load to provide full flow filtering. This method is effective in many types of systems having relatively low fluid flow. Interposing a filter in line before the load is often impractical in those high pressure systems with relatively large fluid flows. Further, maintaining filter elements in such an environment is generally quite expensive. Alternately, full flow filtering may be provided after fluid has serviced the load. In this method of filtering, a filter is typically interposed in the return line between the load and the sump. Additionally, as return line filters become dirty, they develop back pressure. The development of back pressure can be a problem in that a number of valving systems do not perform properly with the application of back pressure. An additional method of filtering disposes a filter in the sump. By nature, these filters are coarse so as not to affect flow of fluid, for example, to the pump. Generally, the fluid filter by the U.S. Pat. No. 6,908,545 includes a high pressure filter module assembly comprising a high pressure manifold, a disposable primary filter element, and a high pressure filter bowl which is liquid-tightly connected at one end to the high pressure manifold and is closed at the other end. The high pressure manifold also includes a fluid inlet passage, a fluid outlet passage, a priority valve, a disposable secondary filter element, and a high pressure relief valve. Under normal flow operating conditions, the flow enters the high pressure manifold through the fluid inlet passage. The priority valve allows the flow to enter the primary circuit (flow through the primary filter element), and flow out through the fluid outlet passage. During peak flow conditions, the priority valve directs flow to the secondary circuit (flow through the secondary filter) and out through the fluid outlet passage. The high pressure filter module assembly utilizes the priority valve installed in the high pressure manifold to allow for continuous filtration of the hydraulic fluid up to a predetermined flow and pressure rates. The purpose of the priority valve is to guarantee that all available flow up to a predetermined flow rate will go to a primary (priority) circuit, including the primary filter element. Any excess flow rate will be diverted to a parallel secondary circuit. This parallel secondary flow or excess flow is filtered through a second filter element before the fluid exits through the outlet. The return filter module assembly also utilizes a priority valve installed into a return manifold that allows for continuous filtration of the hydraulic fluid up to a predetermined low flow rate.

The described hereinabove apparatus is also complex, expensive and inefficient.

Some well-known filter assemblies are generally of the tubular configuration having a removable end wall providing easy access to the interior of the filter housing for replacement of the filter elements, wherein one end of the filter element is supported on a central structural support, which also supports a bypass valve therewith. Such typical structure is depicted in U.S. Pat. No. 3,618,776 and it is apparent in such arrangement that there is little tolerance for variations in axial dimensions and that the central part of the filter element is obstructed to a degree by the central mounting posts. Further, a machined head is used as the closure member, this being a relatively heavy and expensive structure which is machined to fit the housing and which is tapped for receipt of the central support post.

Slightly different mounting of the filter element in a filter housing is described in U.S. Pat. No. 3,640,390 wherein a spider assembly is employed at one end of a filter element which together with a central compression spring at the other end serves to support the element within the filter housing. The entire filter housing is supported on and positioned relative to a threaded central fluid port. The position of the filter element with respect to the housing is substantially fixed and is dependent upon support provided at the inside diameter of the filter element. The support structure in this instance also houses a bypass valve therein and is removed with the filter element for replacement purposes.

The filter assembly with removable end structure by the U.S. Pat. No. 4,142,973, demonstrates a bypass valve of a particular configuration. In this apparatus the bypass valve is radially oriented in a head casting of the filter assembly at a position in line with the inlet port. The filter assembly works only for unidirectional fluid flow.

Another hydraulic fluid filter and bypass valve by U.S. Pat. No. 4,279,746 describes the apparatus comprising a tubular filter assembly having a mount for the filter element which positions the element both axially and radially and allows axial replacement thereof through a removable end wall of the filter housing. The inward end of the filter element is slidably supported on a fixed end wall boss. A bypass valve is retained in the mount in a compact arrangement with a portion of the valve within the filter element and removable therewith. More specifically in the detail, the apparatus includes The device provides the forward and reverse fluid flows. The assembly includes a bypass valve therein which is inserted by a simple push-in and twist, snap-fit arrangement, and is similarly readily removable. The valve is insertable in a mounting aperture in either a forward or reverse direction and includes reversible components so as to be responsive to forward or reverse flow conditions. A "spider type" mounting member supports the filter element at the outside diameter at one end thereof, and positions same radially within the filter housing at a predetermined axial distance from the removable end wall. The spring at the other end of the housing bias the filter element and mount into engagement with the end wall so that the mount is positioned relative to the housing and to a radially oriented access port. A spacer on the mount provides a relatively unobstructed peripheral area for fluid flow at the outside of the filter element and assures a three-point mounting support in engagement with the inner wall of the filter housing for coaxial positioning of the filter element at the location of the outlet port. The "snap-in type" bypass valve assembly provides a reversible structure, wherein the central support pin, and spring may be reversed as well as the bypass valve mount containing the valve seat thereon for either forward or reverse flow operation at the same mounting location. Specifically but generally, the apparatus comprises a tubular metal housing, having a first end at which an end cover is removably attached, and a remote end, which includes a closure member consisting of a generally conical "shell-shape" member terminating in a tubular boss portion, the closure member, being secured to the tubular housing. The end wall of the closure member is open forming an inlet port to the housing. An outlet port, consisting of a radially disposed tubular member, is rigidly connected to the first end of the housing, thereby providing communication with the interior by way of aperture in the housing. A tubular filter element is secured at either end by a metal cap, having an annular elastomeric seal, which extends radially over the end and a short distance axially within that tubular filter element. The filter element is supported at one end on boss of the closure member, being biased to the left by compression spring surrounding the boss. A first spacer projects radially from the periphery of the seat at one end of the support. The second spacer, forming a part of the filter element mount, consists of the equally spaced axially extending projections of the side wall of the support.

Such known devices are extremely complex, require the presence of the springs, specific spacers, etc., and very expensive.

Those skilled in the art will readily observe that numerous modifications and advantages of the improved methods and apparatus for filtration may be made while retaining the teachings of the invention.

The implementation of the improved methods and apparatus for filtration provides the inexpensive and efficient method and device for law viscosity fluid filtration.

Thus, the known prior art does not provide the efficient, non-expensive and convenient methods and apparatus for filtration, and the present invention substantially departs from the apparatus/devices of the prior art.

DESCRIPTION OF THE DRAWINGS

In order that the invention and the manner in which it is to be performed can be more clearly understood, embodiments thereof will be described by way of example with reference to the attached drawings, of which.

Figure 1:
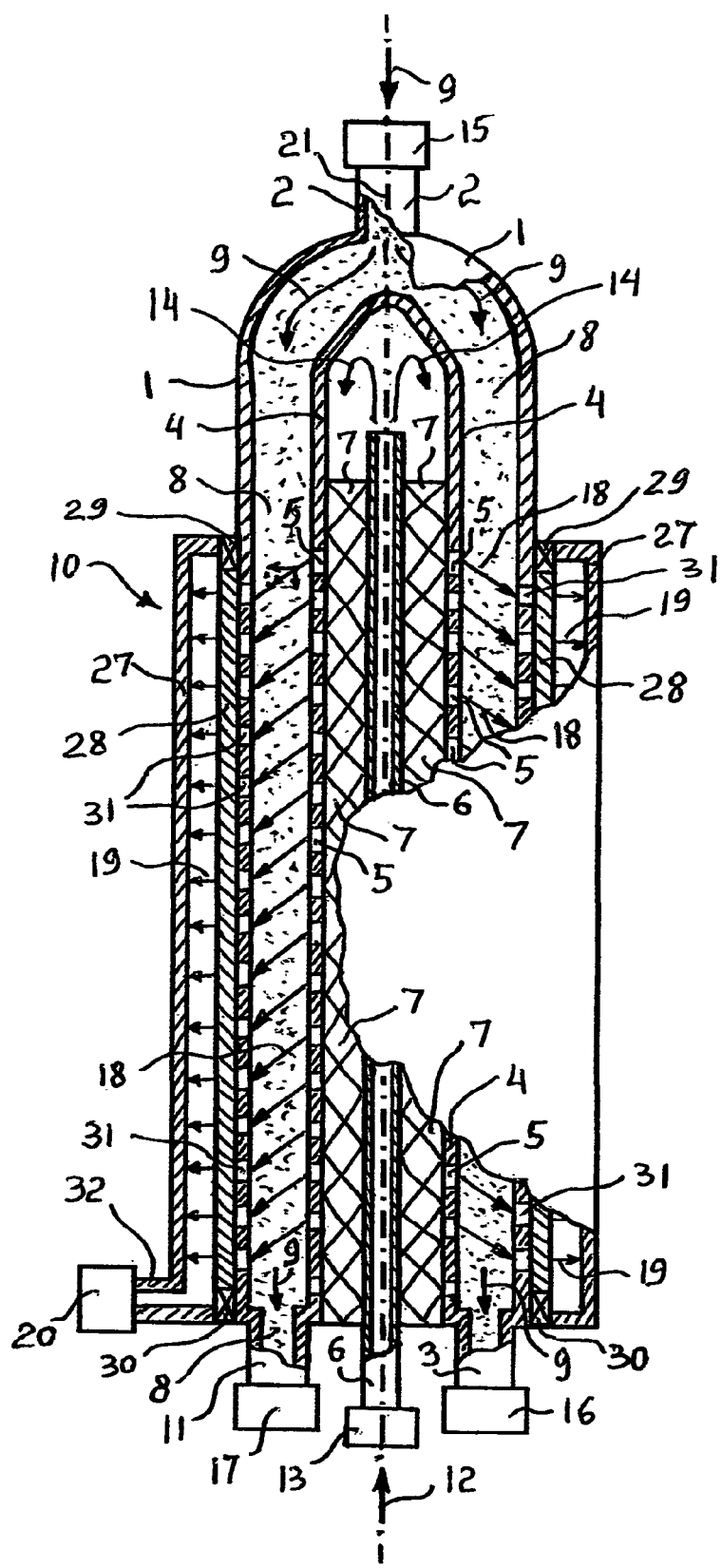
FIG. 1 is a simplified drawing of the improved apparatus.

It is understood, that these illustrations and drawings are the examples of the improved method and apparatus configurations and architectures, and those skilled in the art will readily observe that numerous steps, structures, modifications and advantages of the improved method and apparatus (i.e., methods and apparatus for filtration) may be made while retaining the teachings of the present invention.

SUMMARY OF THE INVENTION

In view of the foregoing disadvantages inherent in the known prior art, the present invention provides an improved methods and apparatus for filtration. As such, the general purpose of the present invention, which will be described hereinafter in greater details, is to provide the methods and apparatus for filtration. The improved apparatus, operating by the improved methods, can be successfully used in the boiling room/house to provide the warm/hot water for the water heating systems in the buildings. The filtration of the water is necessary in order to remove the salt and its chemicals from the water, because the salt in the water will faster destroy the metallic components of the water heating systems in the buildings, etc. Also, the filtered (salt-free) water is used for the cooling of the appropriate equipment of the electrical power stations, etc.

The improved method and apparatus have many of the advantages of the fluid filtration through the movable filtering substance mentioned heretofore and many novel features that result in the efficient, secured and convenient filtration of the fluid, which is not anticipated, rendered obvious, suggested or even implied by any of prior art method and apparatus/devices for fluid filtration, either alone or in any combination thereof.

Also, the improved methods and apparatus provide a unique possibility of the filtration "reversibility", i.e., the filtration (cleaning) of the movable granular (arenaceous) substance (material) through the flowing fluid. For instance, the clean sand is often usable in the medicine for physical therapy (e.g., warm/preheated/sand in the fabric bags for the human muscle relaxation, etc.). Also, such filtration (cleaning) can be implemented for the initial filtering (cleaning) of the open-cast (strip) mined (or other types of mined) quartz, massively usable in the electro-mechanical engineering, medical equipment and in the electrical/electronic industry.

To attain this, the present invention generally comprises a body including a substance inlet tubular member for passage of substance into the body, a substance outlet tubular member for passage of substance out of the body, a fluid inlet tubular member for passage of fluid into the body, a fluid outlet device for passage of fluid out of the body, a fluid distribution member comprising a plurality of apertures (perforation), and a diaphragm.

DESCRIPTION OF THE PREFERRED EMBODIMENTS

With reference now to the drawings, the improved methods and apparatus for filtration embodying the principles and concepts of the present invention.

As it is understandable, the use of one of the terms for the apparatus' parts/components does not exclude the other meanings for the used terms and parts, if otherwise not specified. This description has many other terms for which this condition is applicable too.

In the FIGS. 1-5 are shown the simplified drawings of the improved apparatus for filtration.

Referring to FIG. 1, the improved apparatus comprises a body 1, which is preferably of a cylindrical configuration. The body 1 includes a substance inlet tubular member 2 for passage of a substance 8 into the body 1. The substance inlet tubular member 2 is located at the one side of the body 1. The substance inlet tubular member 2 is extended from the body 1, as it is shown in FIG. 1. The substance inlet tubular member 2 can be rigidly connected (not shown) to the body 1. In FIG. 1 is conditionally shown a single substance inlet tubular member 2, but the substance inlet tubular member 2 can be represented by at least two (not shown) or more inlet tubular members (not shown).

Also, the body 1 comprises a substance first outlet tubular member 3 and substance second outlet tubular member 11 for passage of the substance 8 out of the body 1. The substance first outlet tubular member 3 and substance second outlet tubular member 11 are located at the other side of the body 1, as it is shown in FIG. 1. The substance first outlet tubular member 3 and substance second outlet tubular member 11 are extended from the body 1, as it is shown in FIG. 1. The substance first outlet tubular member 3 and substance second outlet tubular member 11 can be rigidly connected (not shown) to the body 1 too.

The substance outlet passage from the body 1 is conditionally represented in FIG. 1 by two outlet tubular members: substance first outlet tubular member 3 and substance second outlet tubular member 11, but the substance first outlet tubular member 3 and second substance outlet tubular member 11 can be represented by a single outlet tubular member (not shown) or by more than two substance outlet tubular members (not shown). If there are two or more than two substance outlet tubular members, then their operations can be synchronized (not shown).

The body 1 further comprises a fluid distribution member 4 comprising a plurality of apertures 5 (perforation), and a diaphragm 7. The fluid distribution member 4 is preferably located in the center of the body 1 and preferably can be of the tubular (cylindrical) configuration. The fluid distribution member 4 includes a fluid inlet tubular member 6 for passage of fluid into the fluid distribution member 4 of the body 1. The fluid inlet tubular member 6 is preferably located in the center of the fluid distribution member 4, and surrounded by a diaphragm 7, as it is shown in FIG. 1. The arrows 9 represent the direction of the flow of the substance 8. The substance 8 generally is a granular (arenaceous) material, for example, such as a sand or alike.

As it is depicted in the FIG. 1, the apparatus also comprises: a fluid inlet valve 13, which is rigidly hermetically (sealably) connected to the fluid inlet tubular member 6 to prevent a possibility of fluid leakage; a substance inlet valve 15, which is rigidly connected to the substance inlet tubular member 2 to prevent a possibility of leakage; a substance first outlet valve 16 and a substance second outlet valve 17, which are rigidly hermetically (sealably) connected to the substance first outlet tubular member 3 and to substance second outlet tubular member 11 respectively, in order to prevent a possibility of leakage of the fluid residue (not shown) from the already wet substance.

Figure 4:
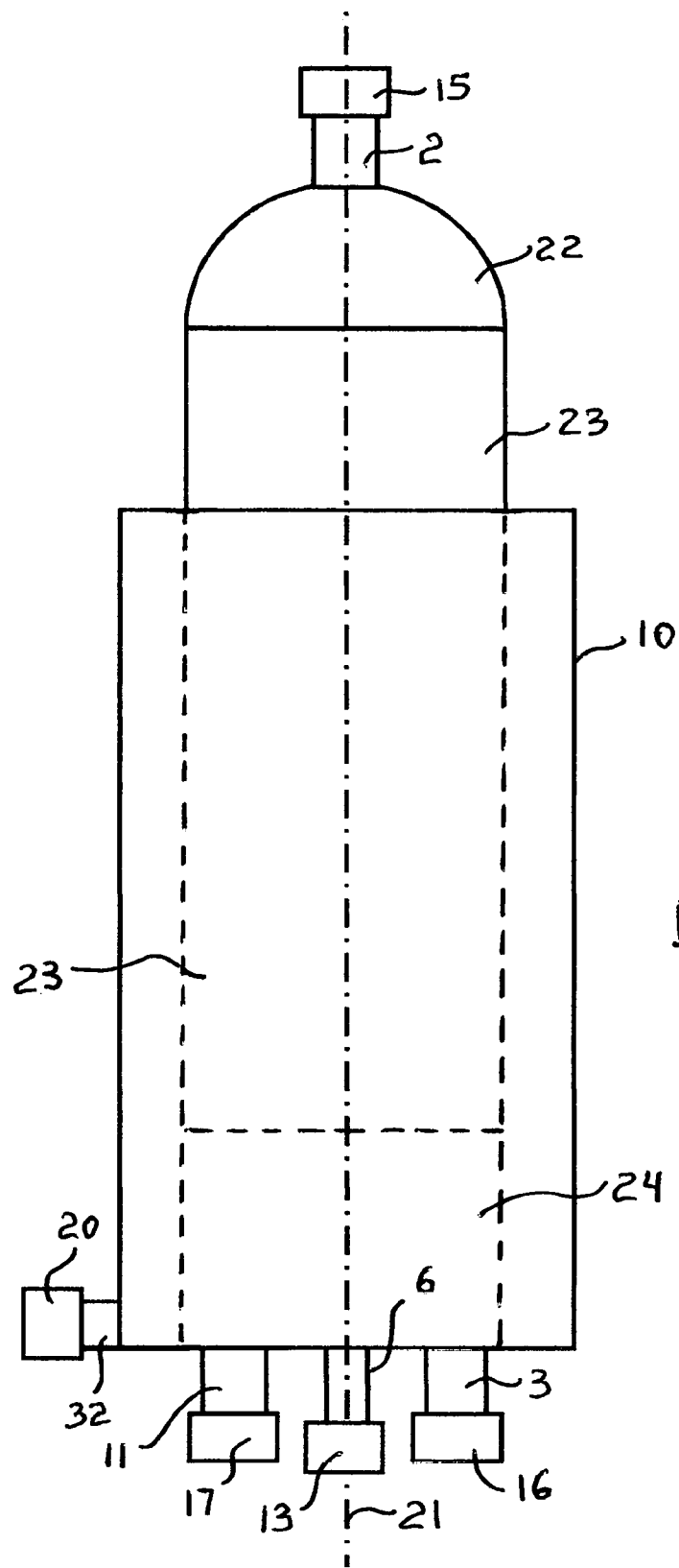
FIG. 4 is a simplified general view of the second configuration of the improved apparatus.

Structurally, the body 1 can comprise an inlet portion 22, a central portion 23 and an outlet portion 24, as it is shown in FIG. 4. The inlet portion 22 is sealably (hermetically) connected to one side of the central portion 23 and the outlet portion 24 is sealably (hermetically) connected to another side of the central portion 23.

Referring to the FIG. 4, the inlet portion 22 of the body 1 includes a substance inlet tubular member 2 for passage of a substance 8 into the body 1. The substance inlet tubular member 2 can be extended from the inlet portion 22 of the body 1 (not shown in FIG. 4) or can be rigidly connected (not shown) to the inlet portion 22 of the body 1. In FIGS. 1, 3-5 is conditionally shown a single substance inlet tubular member 2, but the substance inlet tubular member 2 can be represented by at least two (not shown) or more inlet tubular members (not shown).

Figure 5:
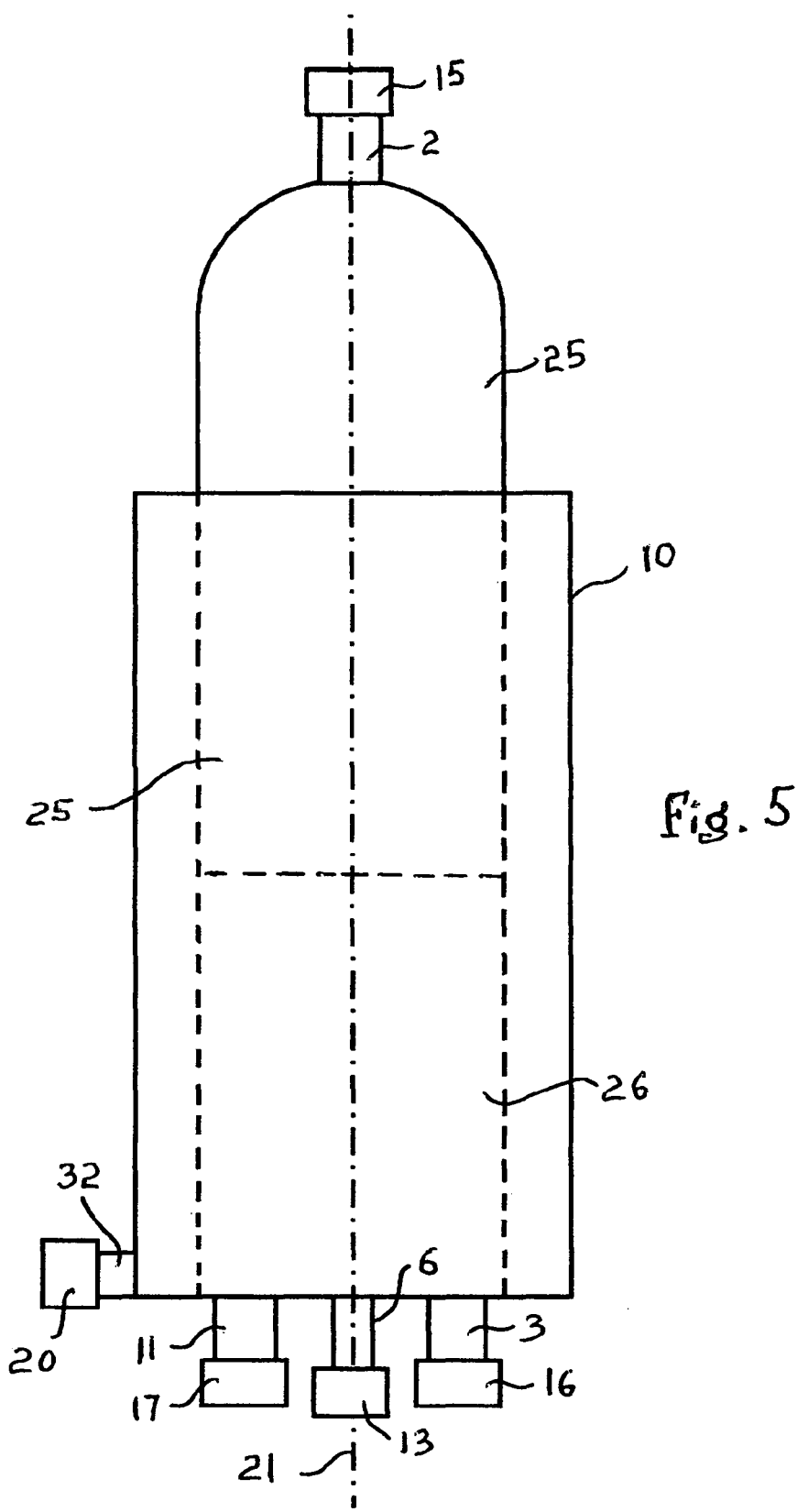
FIG. 5 is a simplified general view of the third configuration of the improved apparatus.

The outlet portion 24 of the body 1 comprises a substance first outlet tubular member 3 and substance second outlet tubular member 11 for passage of the substance 8 out of the body 1. The substance first outlet tubular member 3 and substance second outlet tubular member 11 can be extended from the outlet portion 24 of the body 1 (not shown in FIG. 4) or can be rigidly hermetically (sealably) connected (not shown) to the outlet portion 24 of the body 1 too. It should be understandable, that the body 1 can be presented by two halves (without central portion 23), for example, by a first portion 25 of the body 1 and by a second portion 26 of the body 1, as it is shown in FIG. 5. For such structure of the body 1, the one half of the central portion 23 is belonged to the first portion 25 of the body 1 and another half of the central portion 23 is belonged to the second portion 26 of the body 1. The structure of the body 1 is not limited to the structures described herein, i.e.: the body 1 can be represented by not one portion (FIGS. 1, 3), not two portions (FIG. 5) or not three portions (FIG. 4), but, for instance, by four portions (not shown), wherein the central portion 23 can be represented by two ringular portions (e.g., by two rings of cylindrical configuration hermetically (sealably) connected to each other into one central portion 23 of the body 1), or the body 1 can be represented, for example, by two hermetically connected portions (e.g. welded to each other/ not shown/) being separated along the axis 21 before to be connected to each other, etc.

It should be understandable, that the title(s), for example, such as "tubular member(s)" is(are) not limited to the tubes of cylindrical configuration only. It can be any appropriate type and configuration of the tubes, still teaching of the improved method(s) and apparatus of the present invention. The same can be related to the fluid distribution member, and other appropriate components of the improved apparatus for filtration, for example, as it was mentioned hereinabove, the cylindrical configuration of the body 1 is preferred, but the body 1 can be of rectangular, square or even triangular geometrical forms/configurations, or any other suitable forms.

The apparatus also comprises the fluid outlet device 10 which is rigidly hermetically (sealably) connected to the body 1. The fluid outlet device 10 comprises a fluid outlet intermediate collector 27, which is rigidly hermetically (sealably) connected to the body 1 in order to prevent a possibility of fluid leakage, and a fluid outlet valve 20, which is rigidly hermetically (sealably) connected to the fluid outlet tubular member 32 to prevent a possibility of that fluid leakage. As it is shown in FIG. 1, the fluid outlet tubular member 32 is extended from the fluid intermediate collector 27, but the fluid outlet tubular member 32 can be rigidly hermetically (sealably) connected to the fluid intermediate collector 27 of the fluid outlet device 10.

The portion of the body 1, which is "covered" by the fluid outlet intermediate collector 27, comprises the perforation 31. The fluid outlet device 10 can comprise a filter element 28, filtering fluid from the small (e.g., microscopical) elements (contaminations) of the substance 8, as it is shown in FIG. 1.

It should be understandable, that the fluid outlet device 10 can be represented by two portions of the ringular configuration [e.g., by two rings of cylindrical configuration (not shown) hermetically (sealably) connected to each other (not shown) in one portion of device 10 and hermetically (sealably) connected to the body 1], or the device 10 can be represented, for example, by three or more hermetically connected portions (not shown), etc. The fluid outlet device 10 can be also represented by two or more segments/sectors (sections) [not shown], separated longitudinally (not shown) and connected to each other by the linear elongated gaskets (not shown), while being circularly sealed to the body 1 by the ring-gaskets of the typical configurations, for example, such as a first gasket 29 and a second gasket 30, shown in FIG. 1.

The improved methods provide the following operations of the improved apparatus for filtration.

Referring to FIG. 1, the fluid (not shown) follows from the fluid inlet valve 13 in the direction of the fluid flow first direction 12 into the fluid inlet tubular member 6. From the fluid inlet tubular member 6, the fluid follows within the fluid distribution member 4 in the direction of the fluid flow second direction 14 to the diaphragm 7 for more uniform distribution of the fluid within fluid distribution member 4 and further passage through the apertures 5 (through the perforation) of the fluid distribution member 4. Diaphragm 7 can be represented by any suitable material having a porosity characteristic or by any suitable perforated material, which is most preferable.

As demonstrated in the FIG. 1, the substance 8 (herein further may be mentioned as "substance") from the substance inlet valve 15 follows through the body 1 in the substance flow direction 9 to the substance first outlet tubular member 3 and substance second outlet tubular member 11. The substance 8 can be represented by the appropriate catalysts, sorbents or ionic compounds of the crystalline structure, etc., providing salt removal or at least salt decreasing in the water or any other appropriate fluid (liquid). Further, the substance 8 from the substance first outlet tubular member 3 and substance second outlet tubular member 11 through the substance first outlet valve 16 and substance second outlet valve 17 respectively removes from the body 1 of the improved apparatus.

The fluid (not shown) follows through the substance 8 in the fluid flow third direction 18 to the fluid outlet device 10, wherein the filtered fluid follows in the fluid flow fourth direction 19 to the to the fluid intermediate collector 27, and further through the fluid outlet tubular member 32 and fluid outlet valve 20 for exit.

The improved apparatus operates with respect to the differential pressure between fluid flow pressure and substance flow pressure (with respect to the difference of the pressures of the fluid flow and substance flow):

$$\Delta P = f(P_{Fluid}, P_{Subs.}, S, F_{Fr.}) \tag{1}$$

wherein:
$f$ is a functional;
$P_{Fluid}$ is a pressure of the fluid flow;
$P_{Subs.}$ is a pressure of the substance flow;
$S$ is a cross-sectional area under pressure's influence (exposed to pressure);
$F_{Fr.}$ is a frictional force (force of friction);
$\Delta P$ is a differential pressure (cross-head) of the flow pressures $P_{Fluid}$ and $P_{Fluid}$, wherein the value of pressure P is very well known from the basic mechanics (mechanical physics), as:

$$P = \lim_{\Delta S \to 0} (\Delta F_n / \Delta S) = (\partial F_n / \partial S) \tag{2}$$

wherein:
P is a value of pressure;
$F_n$ is a normal force;
$\Delta F_n$ is a value of normal force, applied to the area;
$\Delta S$ is an area under pressure (exposed to pressure);
$\partial F_n$ is a derivative of the normal force $F_n$;
$\partial S$ is a derivative of the area under force.

Therefore, the improved methods and apparatus for filtration operates in compliance with the inequality:

$$0 < \{\Delta F = [(P_{Fluid} \times S_{Fluid}) - (P_{Subs.} \times S_{Subs.})]\} \tag{3}$$

wherein:
$P_{Fluid}$ is a pressure of the fluid flow;
$P_{Subs.}$ is a pressure of the substance flow;
$S_{Fluid}$ is a cross-sectional area under fluid's pressure influence (under exposure to fluid pressure);
$S_{Subs.}$ is a cross-sectional area under substance's pressure influence (under exposure to substance pressure);
$\Delta F$ is a differential force (cross-head) of the flow forces $F_{Fluid}$ ($F_{Fluid} = P_{Fluid} \times S_{Fluid}$) and $F_{Subs.}$ ($F_{Subs.} = P_{Subs.} \times S_{Subs.}$),
and the substance flow force can be described by the following equation:

$$F_{Subs.} > \begin{vmatrix} 0 \\ |F_{Fr.}| \end{vmatrix} \tag{4}$$

wherein: $F_{Fr.}$ is a frictional force (is a force of friction).

Figure 2:
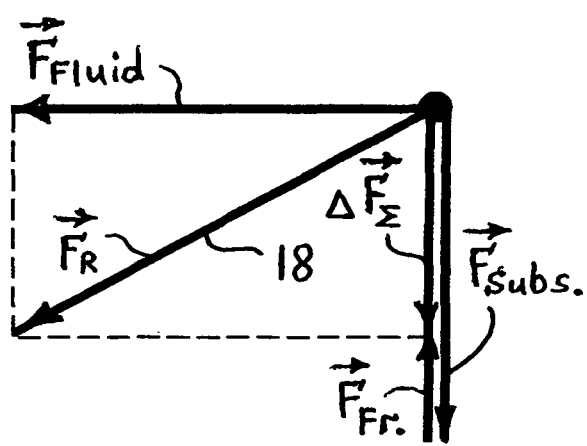
FIG. 2 is a simplified vector diagram.
Figure 3:
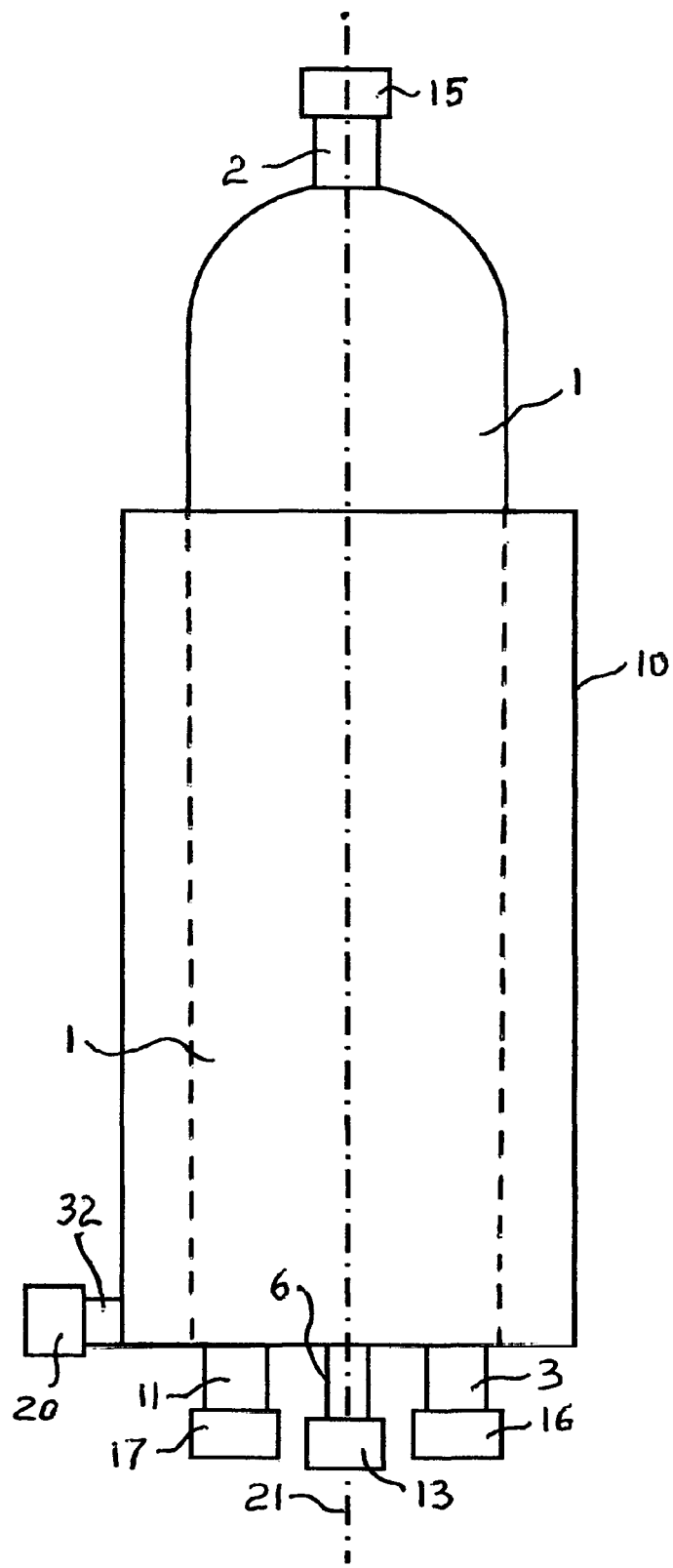
FIG. 3 is a simplified general view of the first configuration of the improved apparatus.

As it follows from FIG. 2, the value of the substance flow force $F_{Subs.}$ of its vector $\vec{F}_{Subs.}$ should be bigger than a zero and bigger than the absolute value $|F_{Fr.}|$ of the frictional vector $\vec{F}_{Fr.}$ It means that the value of the substance flow final force $\Delta F_\Sigma$ of its vector $\Delta \vec{F}_\Sigma$ should be always bigger than zero, i.e.:

$$[\Delta F_\Sigma = F_{Subs.} - F_{Fr.}] > 0 \quad (5)$$

wherein: $\Delta F_\Sigma$ is a substance flow final force {the vector $\Delta \vec{F}_\Sigma$ of the substance flow final force $\Delta F_\Sigma$ is a projection of the vector $\vec{F}_R$ of the resultant force $F_R$ on the vector $\vec{F}_{Subs.}$ (FIG. 2) [the direction of vector $\vec{F}_R$ is coincident with the fluid flow third direction 18 (FIGS. 1, 2)]}.

The FIG. 1 depicts the apparatus for filtration for use in the vertical position, but the apparatus can also operate, for example, in the horizontal position (not shown). For the improved apparatus, used in the horizontal position (not shown), the fluid outlet valve 20 for passage of fluid out of the body 1 can be located in the middle (not shown) of the body 1 or in any other suitable location, and the fluid distribution member 4 with the inserted fluid inlet tubular member 6 and diaphragm 7 can be located not in the center of the body 1, as it is shown in FIG. 1 for the vertical position of the apparatus, but at the upper side (not shown) of the body 1, and the diaphragm 7 can be flat (not shown) instead of to be of the cylindrical form (surrounding fluid inlet tubular member 6/FIG. 1/), etc.

The same improved apparatus successfully provides a possibility of the filtration "reversibility", i.e., the filtration (cleaning) of the movable granular (arenaceous) substance (material) through the flowing fluid. The improved apparatus can be used for filtration of the substance 8 by the fluid (not shown), instead of to filter the fluid (e.g., water/not shown/) by the substance 8. For instance, the clean sand is often usable in the medicine for physical therapy (e.g., warm/preheated/sand in the fabric bags for the human muscle relaxation, etc.). Also, such filtration (cleaning) can be applicable for the initial filtration (cleaning) of the open-cast (strip) mined (or other types of mined) quartz, which for example, is massively used in the mechanical engineering, medical equipment and in the electric/electronic industry. When the improved apparatus is used for filtration (cleaning) of the substance, the filter element 28 of the fluid outlet device 10 can be not used.

It should be understandable, that the configurations, forms and dimensions of the improved apparatus and its parts/members/components and their functional meaning are presented conditionally in the FIGS. 1, 3-5 for more specific and full description of the improved methods and apparatus for filtration. The presentation of the apparatus' components/parts in FIGS. 1, 3-5 are not limited to the described in this invention and can be reasonably equivalently inter-distributed (inter-re-distributed) between each other, still teaching of the improved method and filtering apparatus of the present invention. It is understood, that the distribution of the fluid and/or substance and diaphragm material can be provided by any suitable methods and devices, but it still continue teaching of the improved method and apparatus of the present invention.

Also, it should be understandable, that exemplification of the improved structures and steps of the methods are simplified and presented conditionally, and may be represented by any similar structures and steps, continuing teaching of the improved method and apparatus of the present invention.

The improved method and apparatus for filtration are significantly needed to provide the filtered (cleaned, non-chemically-"aggressive") fluid or filtered (initially cleaned) granular substance for the use in the building water-heating systems and/or in the electrical power stations, or in the medicine and/or in the electrical/electronic industries.

CONCLUSION, RAMIFICATION AND SCOPE

Accordingly the reader will see that, according to the invention, the methods and apparatus for filtration. There has thus been outlined, rather broadly, the more important features of the invention. In this respect, it is understood that the invention is not limited in its application to the details of steps, construction/structures and to the arrangements of the components (parts, etc.) set forth in the description and/or drawings. The invention is capable of other embodiments and of being practiced and carried out in various ways. Also, it is to be understood that the phraseology and terminology employed herein are for the purpose of description and should not be regarded as limiting.

While the above description contains many specificities, these should not be construed as limitations on the scope of the invention, but as exemplification of the presently-preferred embodiments thereof. Many other ramifications are possible within the teaching to the invention. For instance, the improved methods and structure can be fully and successfully used in the geological and/or gemstone industries, e.g. for initial filtering (cleaning) of the gemstones after mining for their more clear visual recognition, etc.

The persons of ordinary skills and/or creativity in the art will readily observe that numerous modifications and advantages of the improved methods and apparatus may be made while retaining the teachings of the invention.

As such, those skilled in the art will appreciate that the conception, upon which this disclosure is based, can readily be utilized as a basis for the designing of other apparatus for filtration, for carrying out the several purpose of the present invention. It is important, therefore, that the claims be regarded as including such equivalent constructions insofar as they do not depart from the spirit and scope of the present invention.

THE DRAWING REFERENCE NUMERALS

1.—a body;
2.—a substance inlet valve;
3.—a substance first outlet tubular member;
4.—a fluid distribution member;
5.—an aperture;
6.—a fluid inlet tubular member;
7.—a diaphragm;
8.—a substance;
9.—a substance flow direction;
10.—a fluid outlet device;
11.—a substance second outlet tubular member;
12.—a fluid flow first direction;
13.—a fluid inlet valve;
14.—a fluid flow second direction;
15.—a substance inlet valve;
16.—a substance first outlet valve;
17.—a substance second outlet valve;
18.—a fluid flow third direction;
19.—a fluid flow fourth direction;
20.—a fluid outlet valve;

21.—an axis of the body 1.
22.—an inlet portion of the body 1;
23.—a central portion of the body 1;
24.—an outlet portion of the body 1;
25.—a first portion of the body 1;
26.—a second portion of the body 1;
27.—a fluid outlet intermediate collector;
28.—a filter element;
29.—a first gasket;
30.—a second gasket;
31.—a perforation;
32.—a fluid outlet tubular member.

What is claimed is:

1. A method for fluid filtration comprising the steps of:
providing a fluid flow through a fluid inlet tubular member into a fluid distribution member located in a body of an apparatus for said fluid filtration in a fluid flow first direction along said fluid inlet tubular member coincident with an axis of said body;
providing a substance flow from a substance inlet valve through a substance inlet tubular member into said body of said apparatus, wherein said substance is a material of a granular or a crystalline structure;
providing said fluid flow from said fluid inlet tubular member to a diaphragm, surrounding said fluid inlet tubular member within said fluid distribution member, in a fluid flow second direction along said diaphragm;
providing a passage of said fluid flow through said diaphragm and through a plurality of apertures in said fluid distribution member into a substance, flowing inside said body in a direction from said substance inlet tubular member to a substance first outlet tubular member and to a substance second outlet tubular member;
providing said fluid flow through said substance in a fluid flow third direction coincident with a direction of a resultant force vector for the vectors of a flowing fluid force, a flowing substance force and a frictional force;
providing a passage of said substance flow from said body to at least substance first outlet tubular member and a substance second outlet tubular member;
providing an output of said substance flow from said at least substance first outlet tubular member and said substance second outlet tubular member through at least substance first outlet valve and substance second outlet valve respectively;
providing a passage of a filtered fluid from said body to a fluid outlet device in a filtered fluid flow direction perpendicular to said axis of said body;
providing an output of said filtered fluid from said fluid outlet device through a fluid outlet valve.

2. The method of claim 1, wherein further said method provides said fluid flow through at least two fluid inlet tubular members into said fluid distribution member located in said body in said fluid flow first direction along said fluid inlet tubular member coincident with an axis of said body.

3. The method of claim 1, wherein further said method provides said substance flow from at least two substance inlet valves through at least two substance inlet tubular members respectively into said body of said apparatus.

4. The method of claim 1, wherein further said method provides said passage of said substance flow from said body to a substance single outlet tubular member.

5. A method for substance filtration comprising the steps of:
providing a fluid flow through a fluid inlet tubular member into a fluid distribution member located in a body of an apparatus for said fluid filtration in a fluid flow first direction along said fluid inlet tubular member coincident with an axis of said body;
providing a substance flow from a substance inlet valve through a substance inlet tubular member into said body of said apparatus, wherein said substance is a material of a granular or a crystalline structure;
providing said fluid flow from said fluid inlet tubular member to a diaphragm, surrounding said fluid inlet tubular member within said fluid distribution member, in a fluid flow second direction along said diaphragm;
providing a passage of said fluid flow through said diaphragm and through a plurality of apertures in said fluid distribution member into a substance, flowing inside said body in a direction from said substance inlet tubular member to a substance first outlet tubular member and to a substance second outlet tubular member;
providing said fluid flow through said substance in a fluid flow third direction coincident with a direction of a resultant force vector for the vectors of a flowing fluid force, a flowing substance force and a frictional force;
providing a passage of said fluid flow from said body to a fluid outlet device in a direction perpendicular to said axis of said body;
providing an output of said fluid flow from said fluid outlet device through a fluid outlet valve;
providing a passage of a filtered substance from said body to a substance first outlet tubular member and to a substance second outlet tubular member;
providing an output of said filtered substance from said substance first outlet tubular member through a substance first outlet valve and from said substance second outlet tubular member through a substance second outlet valve.

6. The method of claim 5, wherein further said method provides said fluid flow through at least two fluid inlet tubular members into said fluid distribution member located in said body in said fluid flow first direction along said fluid inlet tubular member coincident with an axis of said body.

7. The method of claim 5, wherein further said method provides said substance flow from at least first and second substance inlet valves through at least first and second substance inlet tubular members respectively into said body of said apparatus.

8. The method of claim 5, wherein further said method provides said passage of said filtered substance flow from said body to a filtered substance single outlet tubular member.

9. The method of claim 8, wherein further said method provides said output of said filtered substance from said filtered substance single outlet tubular member through a filtered substance single outlet valve.

10. An apparatus for filtration comprising:
a body, comprising a perforation and comprising
a fluid distribution member, comprising apertures, and including
a fluid inlet tubular member, inserted in said fluid distribution member;
a fluid inlet valve, sealably connected to said fluid inlet tubular member;
a substance first outlet valve, sealably connected to said substance first outlet
a diaphragm, surrounding said fluid inlet tubular member;
a substance inlet tubular member, located at one side of said body;

a substance first outlet tubular member and a substance second outlet tubular member, located at another side of said body;
a substance inlet valve, sealably connected to said substance inlet tubular member,
a substance first outlet valve, sealably connected to said substance first outlet tubular member;
a substance second outlet valve, sealably connected to said substance second outlet tubular member;
a substance, flowing from said substance inlet tubular member of said body to said substance first outlet tubular member and to said substance second outlet tubular member, wherein said substance is a material of a granular or a crystalline structure;
a fluid, flowing through said fluid inlet tubular member in said fluid distribution member;
a fluid outlet device, comprising
a fluid outlet intermediate collector, sealably connected to said body;
a filter element, inserted along said perforation;
a fluid outlet valve, sealably connected to said fluid outlet intermediate collector;
a first gasket, inserted at one side of said fluid outlet intermediate collector;
a second gasket, inserted at another side of said fluid outlet intermediate collector.

11. The apparatus of claim 10, wherein further said substance inlet member is a plurality of substance inlet members.

12. The apparatus of claim 10, wherein further said fluid inlet member is a plurality of fluid inlet members.

13. The apparatus of claim 10, wherein further said substance first outlet member and said substance second outlet member are a substance single outlet member.

14. The apparatus of claim 10, wherein further said substance first outlet valve and said substance second outlet valve are a substance single outlet valve.

15. The apparatus of claim 10, wherein further said diaphragm is perforated.

16. The apparatus of claim 10, wherein further said diaphragm is of a porosity material.

* * * * *